Oct. 6, 1964   G. H. FORSYTH   3,152,048
NUCLEAR REACTORS
Filed Nov. 15, 1961
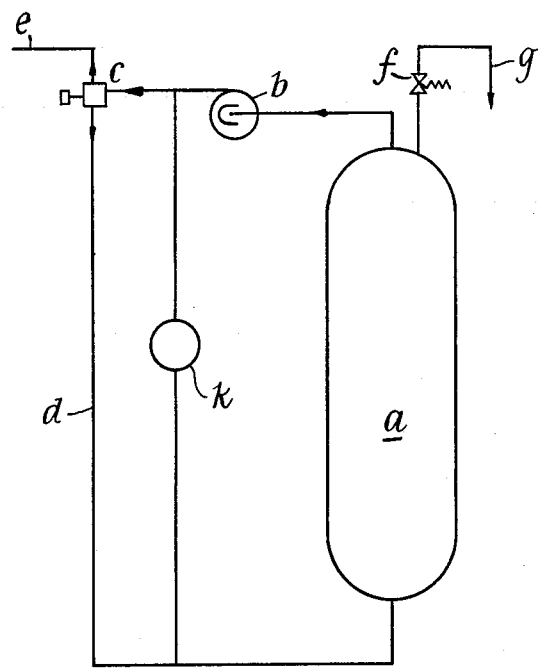
Inventor
George Howard Forsyth
By
Pennie, Edmonds, Morton, Barrows & Taylor
Attorneys

United States Patent Office 3,152,048
Patented Oct. 6, 1964

3,152,048
NUCLEAR REACTORS
George Howard Forsyth, London, England, assignor to Vickers-Armstrongs (Engineers) Limited, London, England, a British company
Filed Nov. 15, 1961, Ser. No. 152,463
Claims priority, application Great Britain, Nov. 25, 1960, 40,698/60
8 Claims. (Cl. 176—20)

This invention relates to nuclear reactors of the boiling water kind employing either light or heavy water, or a mixture of these fluids as a moderator. In such reactors changes in the quantity of steam within the reactor core affect the moderation provided for the thermalizing of neutrons, by the light water, heavy water or the mixture. For example, on taking an increase of steam from the reactor there is a depression in the working pressure of the fluid in the reactor and this causes a release of steam from the water in the reactor core. This affects moderation resulting in a reduction of neutron flux, and thus of reactor power, at the very time when the reactor has to give increased power to meet the increase of demand for steam. The converse happens when taking a reduced quantity of steam from the reactor.

It is an object of the present invention to minimize this difficulty in reactor control.

According to the present invention there is provided a boiling water nuclear reactor having therein a reactor core, either light or heavy water, or a mixture of these fluids as a moderator, and a steam space in which the steam evolved from the boiling moderator accumulates, the reactor being provided with a steam circulating system for drawing steam from said steam space and circulating it through the reactor core thereby to control the reactivity of the core over the load range of the reactor.

For a better understanding of the invention and to show how the same may be carried into effect reference will now be made, by way of example, to the accompanying drawing in which the single figure is a flow diagram of a boiling water nuclear reactor with steam recirculation.

The reactor $a$ contains a core (not shown) near the bottom thereof and a steam space at the top thereof. The reactor employs either light or heavy water, or a mixture of these fluids as a moderator. Control rods (not shown) are provided which are arranged to be operated from the top of the reactor. The heat developed by the reactor core causes the moderator fluid to boil and the resulting steam is fed from the steam space by a pump $b$ to the inlet of a changeover two-way valve $c$. The valve $c$ has a first outlet connected to a line $e$ leading to a steam engine (not shown) or to a dump steam line (also not shown). The valve $c$ has a second outlet connected by a line $d$ to the lower end of the reactor $a$. A by-pass valve $k$ is connected across the valve $c$ between the inlet to the valve $c$ and the line $d$, for by-passing the valve $c$.

The steam space at the top of the reactor is also connected through a safety valve $f$ to a discharge line $g$.

In operation of the reactor $a$ the valve $c$ passes part of the steam generated by the reactor to the line $e$ and the remainder of the steam output is passed through the line $d$ to the lower end of the reactor for recirculation through the reactor core. The valve $c$ is controlled so that the division of the flow of steam between the lines $e$ and $d$ is dependent on the load on the line $e$. On full load the amount of steam circulated through the reactor core by the line $d$ is small and most of the steam present within the core is that being generated to meet full load conditions. When the demand for steam decreases, the amount of steam recirculated through the line $d$ is increased by operation of the valve $c$. By this means, the steam in the reactor core is kept approximately constant. At "no steam demand" on the engine (i.e., no steam is taken by the line $e$), the line $d$ recirculates through the reactor core a quantity of steam approximately equal to the full quantity being generated, thus the coarse control of the reactor to meet transient load or part-load conditions is by variation of the amount of steam passed by the line $d$.

The steam recirculated to the lower end of the reactor is supplied more to the centre of the reactor core than to the periphery of the core whereby the desirable feature of flux flattening is achieved.

Mechanism (not shown) is provided for progressively withdrawing the control rods upwardly throughout the life of the reactor core to adjust for burn-up, the lower end of the core being the active part during the early life of the core. The mechanism for adjusting the control rods is such that if the circulating system including the pump $b$, valve $c$ and line $d$ fails, the mechanism ensures that the reactor is maintained at the full load condition of working and does not exceed this condition, the full load steam being taken from the reactor and distributed between the line $e$ and the safety valve controlled discharge line $g$ in amounts depending on the load demand.

The by-pass valve $k$ is fitted to control the working pressure of the reactor. For example when the steam demand of the engine is at a particular value and the pressure in the reactor is tending to rise above the normal working pressure, then the opening of the valve $k$ is increased thereby causing more steam to be admitted to the lower end of the core whereby the neutron flux is reduced, this causing the pressure in the reactor to fall. The converse of course occurs should the working pressure in the reactor tend to drop below the normal working pressure. The function of the valve $k$ thus provides the "fine" control of the reactor output.

I claim:

1. In the method of controlling the reactivity of the core of a boiling-water nuclear reactor over the load range of the reactor, in which the nuclear reactor is of the type including a reactor core, a water moderator for the core and a steam space for receiving steam evolved from the water moderator boiled by the core, the steps comprising withdrawing steam from the steam space of the reactor and passing the withdrawn steam through the reactor core, and varying the rate at which steam is passed through the reactor core to control the reactivity of the core over the load range of the reactor.

2. The method as claimed in claim 1, in which the rate at which steam is passed through the reactor core is decreased with increasing load on the reactor and increased with decreasing load on the reactor.

3. The method as claimed in claim 1, in which the rate at which steam is passed into the reactor core is increased with rise in the pressure in the reactor and decreased with falling pressure in the reactor.

4. In a boiling water nuclear reactor of the type including a reactor core, a water moderator for said core, and means defining a steam space for receiving steam evolved from the water moderator boiled by said core, the improvement comprising a steam line leading from said space to the reactor core for circulating steam from said space through the reactor core for controlling the reactivity of the core over the load range of the reactor, means in said line for effecting the circulation of the steam, a further steam line for connection to a load, and valve means for apportioning between said lines the steam evolved from the boiling moderator.

5. A reactor according to claim 4, and further comprising a by-pass valve for controlling the steam flow to the reactor and the working pressure of the reactor, the by-pass valve being connected to by-pass said valve means.

6. In a boiling water nuclear reactor of the type including a reactor core within the lower part of said reactor, a water moderator for said core, and means defining a steam space in the upper part of said reactor for receiving steam evolved from the water moderator boiled by the core, the improvement comprising a steam line connecting said steam space with the central part of the lower end of said core for circulating steam from the steam space through the core for controlling the reactivity of the reactor over the load range of the reactor and means in said line for effecting the circulation of steam.

7. In a boiling water nuclear reactor of the type including a reactor core, a water moderator for said core, and means defining a steam space for receiving steam evolved from the water moderator boiled by said core, the improvement comprising a steam line connecting said steam space with said reactor core for conducting steam from said steam space and for circulating same through the reactor core to control the reactivity of the core over the load range of the reactor, means in said line for effecting the circulation of the steam, a discharge line, and a safety valve controlling connection between the steam space and the discharge line to discharge surplus steam in the event of failure of said steam line and circulating means to circulate steam to said core.

8. In a boiling water nuclear reactor of the type including a core, a water moderator for said core, means defining a steam space in the reactor for receiving steam evolved from the water moderator boiled by said core, the improvement comprising a steam line extending from said steam space, a steam pump in said line for drawing steam from said space, a two-way valve in said line receiving the steam delivered by said pump, said valve having first and second outlets, a load line connected to said first outlet, and a steam line connecting said second outlet to the reactor core for passing steam to the reactor core for controlling the reactivity of the core over the load range of the reactor.

References Cited in the file of this patent
UNITED STATES PATENTS
2,998,367    Untermyer _____ Aug. 29, 1961